(12) United States Patent
Bonenfant et al.

(10) Patent No.: US 12,064,822 B2
(45) Date of Patent: Aug. 20, 2024

(54) CUTTING TOOL

(71) Applicant: SECO TOOLS AB, Fagersta (SE)

(72) Inventors: Antoine Bonenfant, St. Martin d'Auxigny (FR); Pascal Derimay, Mehun sur Yèvre (FR)

(73) Assignee: Seco Tools AB, Fagersta (SE)

( * ) Notice: Subject to any disclaimer, the term of this patent is extended or adjusted under 35 U.S.C. 154(b) by 635 days.

(21) Appl. No.: 17/288,365

(22) PCT Filed: Oct. 22, 2019

(86) PCT No.: PCT/EP2019/078702
§ 371 (c)(1),
(2) Date: Apr. 23, 2021

(87) PCT Pub. No.: WO2020/083896
PCT Pub. Date: Apr. 30, 2020

(65) Prior Publication Data
US 2021/0379679 A1    Dec. 9, 2021

(30) Foreign Application Priority Data

Oct. 26, 2018  (EP) .................................... 18202792

(51) Int. Cl.
*B23C 5/22* (2006.01)
*B23C 5/06* (2006.01)

(52) U.S. Cl.
CPC .............. *B23C 5/2213* (2013.01); *B23C 5/06* (2013.01); *B23C 2200/045* (2013.01);
(Continued)

(58) Field of Classification Search
CPC ........ B23C 2200/045; B23C 2200/128; B23C 2210/163; B23C 2210/168; B23C 5/2213;
(Continued)

(56) References Cited

U.S. PATENT DOCUMENTS 6,238,133 B1* 5/2001 DeRoche .............. B23C 5/2213
407/34
2002/0168235 A1* 11/2002 Johnson .................. B23C 5/006
407/43
(Continued)

FOREIGN PATENT DOCUMENTS

EP  2364804 A1  9/2011
EP  2878405 A1  6/2015
(Continued)

*Primary Examiner* — Sara Addisu
(74) *Attorney, Agent, or Firm* — Corinne R. Gorski

(57) ABSTRACT

A cutting tool includes a cutting insert having an anti-rotation stopping indent formed in a transition between a bottom surface and a side surface thereof and includes a first stop surface. The insert seat has at least one anti-rotation stop, which protrudes with respect to a side wall of the insert seat and includes a second stop surface. The anti-rotation stop is arranged to inhibit rotation of the cutting insert in the insert seat by contact between the first and second stop surfaces. The second stop surface is completely located within the anti-rotation stopping indent when the cutting insert is mounted. As seen in a section perpendicular to a common central axis, an angle of less than 180° is formed between a tangent to the second stop surface and a tangent to the first duct at a transition between the two.

14 Claims, 6 Drawing Sheets

(52) U.S. Cl.
CPC .. *B23C 2200/128* (2013.01); *B23C 2210/163* (2013.01); *B23C 2210/168* (2013.01)

(58) Field of Classification Search
CPC ..... B23C 5/06; B23C 2200/168; B23C 5/006; B23C 2200/162
See application file for complete search history.

(56) References Cited

U.S. PATENT DOCUMENTS

| | | | |
|---|---|---|---|
| 2003/0059262 A1* | 3/2003 | Men | B23C 5/2213 407/35 |
| 2006/0245837 A1* | 11/2006 | Dufour | B23C 5/06 407/48 |
| 2007/0183857 A1* | 8/2007 | Wihlborg | B23C 5/2204 407/67 |
| 2011/0318117 A1 | 12/2011 | De Souza Filho et al. | |
| 2013/0129436 A1* | 5/2013 | Hoffer | B23C 5/2213 407/102 |
| 2014/0348600 A1* | 11/2014 | Matsubara | B23C 5/06 407/64 |
| 2022/0105578 A1* | 4/2022 | Rue | B23C 5/2213 |
| 2022/0288706 A1* | 9/2022 | Shikama | B23C 5/2213 |
| 2022/0395915 A1* | 12/2022 | Lee | B23C 5/22 |

FOREIGN PATENT DOCUMENTS

| | | | | |
|---|---|---|---|---|
| JP | 11245105 A * | 9/1999 | | B23C 5/109 |
| JP | 2001079708 A * | 3/2001 | | B23C 5/109 |
| JP | 2007210090 A1 | 8/2007 | | |
| WO | WO-2004094092 A1 * | 11/2004 | | B23C 5/06 |
| WO | 2012131896 A1 | 3/2011 | | |
| WO | 20023218 A1 | 1/2020 | | |

\* cited by examiner

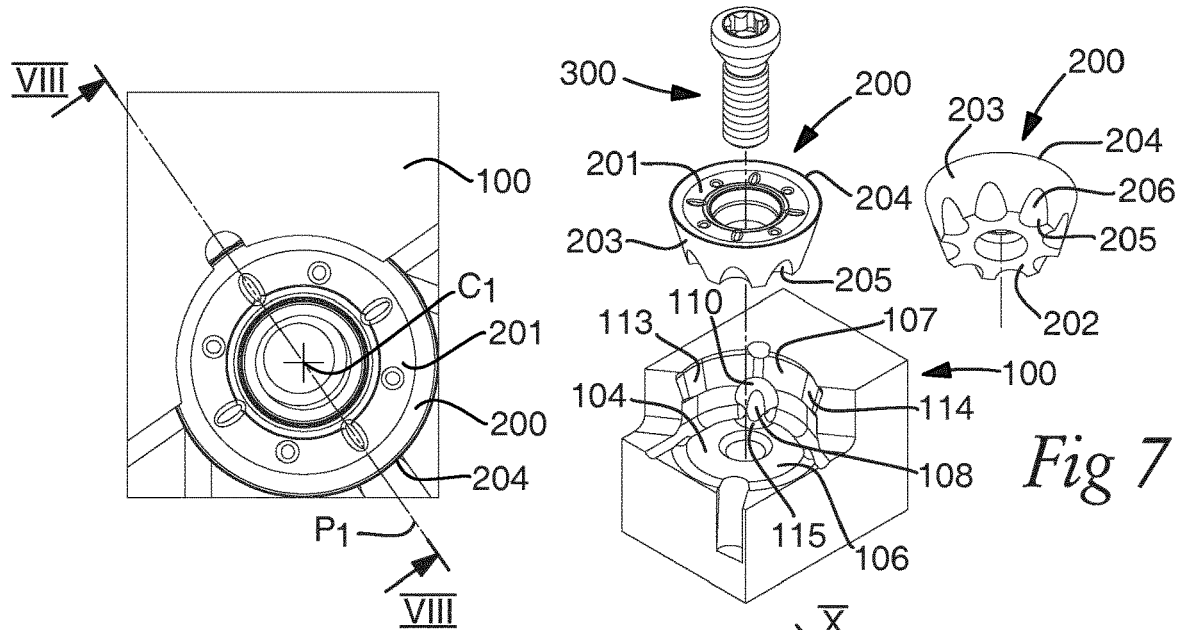
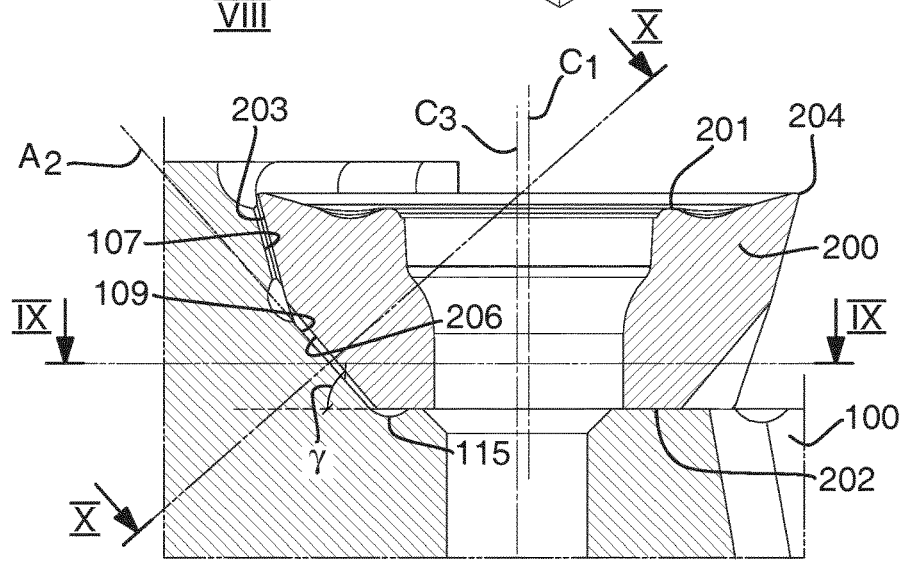
Fig 7
Fig 8
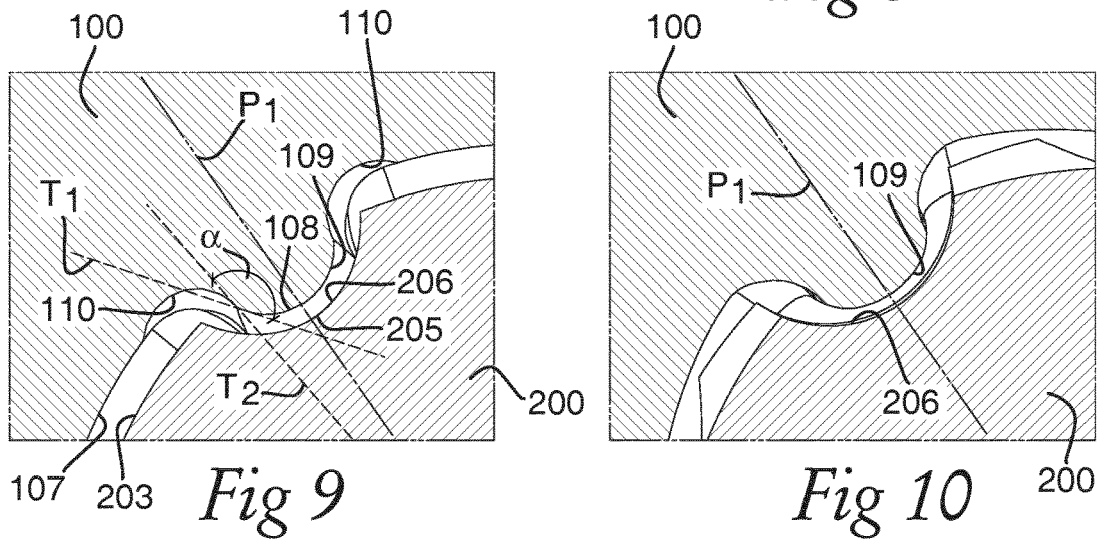
Fig 9                    Fig 10

CUTTING TOOL

RELATED APPLICATION DATA

This application is a § 371 National Stage Application of PCT International Application No. PCT/EP2019/078702 filed Oct. 22, 2019 claiming priority to EP 18202792.0 filed Oct. 26, 2018.

TECHNICAL FIELD

The present invention relates to a cutting tool for chip removing machining of workpieces. In particular, but not exclusively, the invention relates to such a cutting tool for use in milling operations.

BACKGROUND OF THE INVENTION

Cutting tools for chip removing machining commonly comprises a tool body in which replaceable cutting inserts are mounted, either in insert seats formed directly in the tool body or in insert seats provided in cassettes, in turn mounted in seats of the tool body. The cutting inserts may e.g. be fastened using clamping screws or other clamping mechanisms. Support surfaces in the insert seat are used to support the cutting insert during machining, preventing axial and radial movement of the cutting insert within the insert seat. However, during machining the cutting insert also experiences torque that tends to rotate the cutting insert around its central axis. Rotation of the cutting insert may occur in both directions (clockwise or anti-clockwise) in the insert seat, depending on the direction of the cutting forces. The cutting forces can change direction during one operation. In particular, due to the frusto-conical sidewalls and the curved radial support surfaces of the insert seat, rotation within the insert seat is problematic for cutting inserts having a circular basic shape. Rotation of the cutting insert in the insert seat during machining may loosen the clamping screw and lead to cutting edge chipping, ultimately causing mechanical failure.

Another difficulty associated with circular (round) cutting inserts is difficulty in positioning the cutting inserts when changing indexing positions within the insert seat. The absence of straight edges makes the positioning imprecise and the cutting insert life time is thereby more difficult to predict than for square or polygonal cutting inserts.

A further difficulty associated with circular (round) cutting inserts is that their roundness is not perfect and that small manufacturing tolerances are required, which makes the inserts expensive.

WO20023218 discloses a cutting tool comprising a plurality of cutting inserts having a circular basic shape mounted in insert seats of a tool body. The insert seats and the cutting inserts are provided with an anti-rotation mechanism comprising a sinusoidal pattern formed in a sidewall of the cutting insert and two protrusions formed in the insert seat, comprising complementary surfaces to the sinusoidal pattern.

However, the anti-rotation mechanism described in WO20023218 results in a relatively small bottom surface area of the cutting insert, thus reducing the area available for tangential support during machining. For small cutting inserts, this anti-rotation mechanism is therefore not suitable. Moreover, the anti-rotation mechanism is subject to wear during machining, which may cause deformation of the protrusions within the insert seat. As a result of the deformation, it may over time become difficult to appropriately position the cutting insert in the insert seat, in particular since the shape and size of cutting inserts may vary slightly due to manufacturing tolerances. To avoid this, frequent changes of the tool body may be necessary.

SUMMARY OF THE INVENTION

It is an object of the present disclosure to overcome or alleviate at least one of the disadvantages of the prior art, or to provide a useful alternative. In particular, it is an objective to provide a cutting tool in which rotation of the cutting insert within the insert seat can be efficiently prevented also for small cutting inserts. Another objective is to provide a cutting tool which can provide a stable anti-rotation mechanism over time.

To better address these concerns, a cutting tool is provided. Embodiments are set forth in the following description and in the drawings.

The present invention relates to a cutting tool for chip removing machining of workpieces, the cutting tool comprising a body and at least one cutting insert adapted to be mounted in an insert seat of the body, the cutting insert and the insert seat sharing a common central axis when the cutting insert is mounted in the insert seat, wherein the cutting insert has a circular basic shape and comprises:
  a rake surface,
  a bottom surface opposite to the rake surface,
  a side surface extending between the rake surface and the bottom surface,
  a cutting edge formed in a transition between the side surface and the rake surface, and
  at least one anti-rotation stopping indent being formed in a transition between the bottom surface and the side surface and comprising a first stop surface,
wherein the insert seat of the body comprises:
  a bottom support surface configured to abut and support the bottom surface of the cutting insert,
  a side wall comprising at least one side support surface configured to abut and support the side surface of the cutting insert,
  at least one anti-rotation stop protruding with respect to the side wall and comprising a second stop surface, and
  a concavely curved first duct separating the second stop surface from the side wall,
wherein the at least one anti-rotation stop is adapted to inhibit rotation of the cutting insert in the insert seat about the common central axis by contact between the first stop surface and the second stop surface. The cutting tool is characterized in that the second stop surface is completely located within the anti-rotation stopping indent when the cutting insert is mounted in the insert seat, and, when seen in a section taken perpendicularly to the common central axis, an angle of less than 180° is formed between a tangent to the second stop surface and a tangent to the first duct at a transition between the second stop surface and the first duct.

In the cutting tool according to the invention, it is ensured that contact only arises between the first stop surface and the second stop surface as the cutting insert tries to rotate in the insert seat during machining. In other words, a small amount of space is provided between the first stop surface and the second stop surface and the insert can rotate slightly up to 4° in one and/or the other direction, before the first stop surface comes into contact with the second stop surface. Thus, the first stop surface and the second stop surface are configured so that the contact arises between the first stop surface and the second stop surface upon rotation of the cutting insert about the common central axis in one and/or the other rotational direction. The concavely curved duct, formed at an internal angle of less than 180° with respect to the second stop surface, i.e. indented with respect to the second stop surface, ensures that a clearance is provided around the stop surfaces. During machining, the contact between the stop surfaces will cause wear on the anti-rotation stop and the second stop surface will consequently deform over time. However, the clearance around the second stop surface allows the anti-rotation stop to function albeit a larger degree of deformation in comparison with an anti-rotation stopping mechanism lacking the concavely curved duct formed at an angle of less than 180° with respect to the second stop surface. Thus, the anti-rotation stop is adapted to work also for cutting inserts having a shape and size that deviate slightly from specifications due to manufacturing tolerances.

The transition between the second stop surface and the first duct may be a sharp edge, but it may also be a slightly rounded transition. In both cases, the tangent to the second stop surface is the tangent at the point of the second stop surface which is most adjacent to the first duct. Likewise, the tangent to the first duct is the tangent at the point of the first duct which is most adjacent to the second stop surface. Adjacent to the transition, the second stop surface may be either flat or convexly curved, but not concavely curved. Thus, the transition is formed between a flat or convexly curved surface portion of the second stop surface and a concave surface portion of the first duct, forming an internal angle of less than 180°.

The cutting insert preferably comprises a plurality of evenly spaced anti-rotation stopping indents so that the cutting insert may be indexed, thereby improving the tool life of the cutting insert. In this case, the anti-rotation stop and the anti-rotation stopping indents are used to facilitate indexing of the cutting insert. The anti-rotation stopping indents are formed as discrete indents in the circular side surface, i.e. spaced apart from each other and delimited by on one hand the side surface, on the other hand the bottom surface of the cutting insert. This enables a larger bottom surface than in the case when e.g. a continuous sinusoidal pattern is formed in a lower part of the side surface. The proposed solution is therefore suitable also for, and/or in particular for, cutting tools with relatively small cutting inserts, such as having a diameter of 10 mm or less. Preferably, the first stop surface of the at least one anti-rotation stopping indent intersects and is adjacent to the side surface of the cutting insert. Preferably, the first stop surface of the at least one anti-rotation stopping indent intersects and is adjacent to the bottom surface of the cutting insert. Preferably, the first stop surface of the at least one anti-rotation stopping indent is completely delimited by its intersections with the side surface and the bottom surface of the cutting insert. Preferably, the at least one anti-rotation stopping indent is completely defined by the first stop surface.

According to one embodiment, the second stop surface and the first stop surface are symmetric with respect to a first axial plane containing the common central axis and intersecting the anti-rotation stopping indent. Thanks to this additional feature, the anti-rotation stop and the anti-rotation stopping indent have the same function and an equivalent contact arises when the cutting insert rotates in both directions. The rotation of the cutting insert in a first direction is prohibited by a first portion of the second stop surface and the rotation of the cutting insert in a second direction is prohibited by a second portion of the second stop surface, the first portion and the second portion being arranged at different sides of the first axial plane. It is thereby sufficient to provide a single anti-rotation stop which will inhibit rotation of the cutting insert in both directions about the common central axis. Preferably, the at least one anti-rotation stop and the at least one anti-rotation stopping indent are symmetric with respect to the first axial plane connecting the common central axis and intersecting the anti-rotation stopping indent. Thanks to this additional feature, the anti-rotation stop and the anti-rotation stopping indent are substantially equally strong in both directions.

According to one embodiment, the first duct is indented with respect to the side wall. This facilitates machining of the insert seat. This also further improves the conditions for achieving a clearance around the first stop surface of the anti-rotation stopping indent, such as to allow correct positioning of the cutting insert in the insert seat despite a presence of possible imperfections in the transition between the first stop surface and the side surface of the cutting insert.

According to one embodiment, the second stop surface is convexly curved when seen in a section taken perpendicularly to the common central axis. The convex curvature contributes to increase the contact area and also serves to direct or absorb the forces acting on the anti-rotation stop in an inward direction and thereby reduce shear stresses. The second stop surface may also comprise one or more planar surface portions.

According to one embodiment, the first stop surface is concavely curved when seen in a section taken perpendicularly to the common central axis. Such a concavely curved surface may interact with a convexly curved second stop surface to absorb the cutting forces, acting to rotate the cutting insert, in a desired direction. A concavely curved surface is also advantageous for the cutting insert strength. In alternative embodiments, the first stop surface may comprise one or more planar surface portions.

According to one embodiment, the second stop surface intersects a first axial plane containing the common central axis along a first line, which first line is obliquely oriented with respect to the bottom support surface. The first line is preferably a first straight line. The first straight line, defining a direction of extension of the second stop surface, facilitates machining of the insert seats. The first straight line may e.g. be inclined at an angle of 30-75° with respect to the bottom support surface of the insert seat.

According to one embodiment, the first stop surface intersects a first axial plane containing the common central axis along a second line, which second line is obliquely oriented with respect to the bottom surface of the cutting insert. The second line is preferably but not necessarily parallel to the first line or to the first straight line. The second line is preferably a second straight line. The second straight line is defining a direction of extension of the first stop surface. The second straight line may e.g. be inclined at an angle of 30-75° with respect to the bottom surface of the cutting insert, wherein a smaller angle within the mentioned range provides a better surface contact between the side surface of the cutting insert and the side support surface of the insert seat, and a larger angle within the mentioned range facilitates indexing. The angle may be selected in dependence on a clearance angle of the cutting insert. The angle should preferably differ from the clearance angle by 10-40°.

The first stop surface may e.g. comprise a concavely curved surface that follows a first imagined circular or non-circular cylinder having a center axis parallel to the direction of extension of the first stop surface. In other words, the first stop surface is in this case a part of the first imagined cylinder generated by extrusion of a first curve in the direction of the center axis of the first imagined cylinder, the first imagined cylinder preferably but not necessarily having a circular base.

Independently of the nature of the first stop surface, the second stop surface may e.g. comprise a convexly curved surface that follows a second imagined circular or non-circular cylinder having a center axis parallel to the direction of extension of the second stop surface. In other words, the second stop surface is in this case a part of the second imagined cylinder generated by extrusion of a second curve in the direction of the center axis of the second imagined cylinder, the second imagined cylinder preferably but not necessarily having a circular base or a base in the form of an ellipse or a spline.

According to one embodiment, the at least one anti-rotation stopping indent has a cross sectional area that decreases in an upward axial direction from the bottom surface. The cross sectional area is measured in a plane perpendicular to the common central axis.

According to one embodiment, the first stop surface and the second stop surface are configured so that the contact occurring between the first stop surface and the second stop surface upon rotation of the cutting insert about the common central axis is a line contact. The line contact ensures a stable and predictable function of the anti-rotation stop. The first stop surface may e.g. be a concavely curved surface having a first curvature, and the second stop surface may be a convexly curved surface having a second curvature, such that a line contact is achieved. As seen in a section transverse to the direction of extension of the first stop surface, the first stop surface may e.g. be described by a circular arc while as seen in a section transverse to the direction of extension of the second stop surface, the second stop surface may e.g. be described by a spline curve. The first stop surface may e.g. be described by a spline curve, when seen in a section transverse to the direction of extension of the first stop surface, while the second stop surface e.g. may be described by a circular arc when seen in a section transverse to the direction of extension of the second stop surface.

According to one embodiment, the insert seat further comprises a concavely curved second duct extending between the second stop surface and the bottom support surface. It is thereby ensured that a clearance is provided between the cutting insert and the insert seat around the stop surfaces. The second duct, which may be indented with respect to the bottom support surface of the insert seat, also facilitates machining of the insert seat and allows correct positioning of the cutting insert in the insert seat despite a presence of possible imperfections in the transition between the first stop surface and the bottom surface. A first longitudinal end of the second duct may be at least partly adjacent to a first longitudinal end of the first duct and/or a second end of the second duct may be at least partly adjacent to a second longitudinal end of the first duct. This facilitates manufacturing of the insert seat and contributes to an improved strength of the insert seat and the anti-rotation stop. Preferably, there is a third duct extending between the bottom support surface and the side wall. The third duct may comprise two part-ducts provided on opposite sides of the anti-rotation stop. Preferably at least one of the two part-ducts is arranged with a first longitudinal end at least partly adjacent to one longitudinal end of the first duct and/or one longitudinal end of the second duct. Preferably, but not necessarily, the first longitudinal end of the at least one of the two part-ducts separates the first duct from the second duct. Thanks to this, manufacturing of the insert seat and the anti-rotation stop is facilitated. This feature also allows correct positioning of the cutting insert in the insert seat despite a presence of possible imperfections in the transitions between the bottom surface, the first stop surface and the side surface of the cutting insert. This also contributes to an improved strength of the insert seat and the anti-rotation stop. It also ensures that the sensitive corner where the bottom surface, the first stop surface and the side surface of the cutting insert converge is not in contact with the insert seat of the body, which could otherwise lead to fractures of the cutting insert in that area.

According to one embodiment, the at least one anti-rotation stopping indent has an axial extension along the common central axis, which axial extension is between 30-60% of a total axial extension of the at least one cutting insert. Within this interval, the axial extension is sufficiently large to achieve an efficient anti-rotation stopping function and an accurate indexing function, and also sufficiently small to ensure a sufficiently large support interface between the side surface of the cutting insert and the side support surface of the insert seat. A radial extension of the anti-rotation stopping indent may e.g. be such that, at the bottom surface of the cutting insert, a distance between the indent and a through hole of the cutting insert is 10-30% of a largest diameter of the cutting insert, or of an inscribed circle diameter.

According to one embodiment, the second stop surface comprises a pair of planar surface portions adjacent to the first duct. The planar surface portions are preferably arranged at an angle with respect to each other, on opposite sides of an axial symmetry plane. In this embodiment, also the first stop surface may comprise a pair of planar surface portions configured to contact the planar surface portions of the second stop surface upon rotation of the cutting insert in the insert seat.

According to one embodiment, the at least one side support surface of the insert seat comprises two side support surfaces provided on opposite sides of the anti-rotation stop. Efficient support in the axial and radial directions of the cutting tool may thereby be provided. The two side support surfaces are preferably non-adjacent to each other.

According to one embodiment, the anti-rotation stop and the anti-rotation stopping indent are configured so that the contact between the first stop surface and the second stop surface occurs at least partially on the transition between the second stop surface and the first duct. Since the contact is thereby provided at a position relatively far from the common central axis, the conditions for stable function of the anti-rotation stop over time are improved. Furthermore, if the second duct is provided between the second stop surface and the bottom support surface, the anti-rotation stop and the anti-rotation stopping indent may be configured so that the contact between the first stop surface and the second stop surface occurs at least partially also on the transition between the second stop surface and the second duct. Since the contact is provided also at the transition between the second stop surface and the second duct, where the anti-rotation stop has a greater strength, the conditions for stable function of the anti-rotation stop over time are improved. If the first stop surface and the second stop surface are configured so that the contact occurring between the first stop surface and the second stop surface upon rotation of the cutting insert about the common central axis is a line contact, the contact line may extend from the first duct to the second duct.

As a result of a plastic deformation of the anti-rotation stop in the contact zone, the material of the anti-rotation stop will be displaced in and around the contact zone. If the contact between the first stop surface and the second stop surface occurs at least partially on the transition between the second stop surface and a duct—the first duct and/or the second duct—the material will be displaced at least partially into the duct where it has less impact on the function of the anti-rotation stop. Thanks to that, the function of the anti-rotation stop over time is improved.

According to one embodiment, the body is a tool body having a front end adapted for cutting engagement with a workpiece and a rear end adapted for mounting the cutting tool to a tool holder, wherein the insert seat is provided in the front end of the body.

The body may also be a cassette which is in turn adapted to be mounted in a seat of a tool body. In that case, the cutting tool comprises the tool body, the cassette and the cutting insert, wherein the insert seat is provided in the cassette.

According to one embodiment, the cutting tool is a milling tool. The milling tool is adapted to be rotated about a central axis of rotation and preferably comprises a plurality of insert seats provided at a front end of the milling tool.

Preferably, the anti-rotation stop is integrally formed with the body.

Alternatively, the cutting tool may e.g. be a turning tool.

Definitions

By a cutting insert with a circular basic shape is intended a cutting insert having a circular or substantially circular (i.e. within manufacturing tolerances) cutting edge and a frusto-conical or circular cylindrical side surface.

By the second stop surface being completely located within the anti-rotation stopping indent is intended that, when the cutting insert is mounted in the insert seat, a shortest distance between any point on the second stop surface and the common central axis is shorter than a shortest distance between the side surface of the cutting insert and the common central axis at a corresponding axial level (i.e. as seen in a section perpendicular to the common central axis).

When a surface of a part is referred to as convex or concave, it is to be understood that the curvature is observed from outside of the part or the surface. For example, the concavely curved first duct has a concave curvature as seen from a point outside of the body, e.g. from a point above the insert seat on the common center axis.

BRIEF DESCRIPTION OF THE DRAWINGS

Embodiments of the present invention will hereinafter be further explained by means of non-limiting examples with reference to the appended drawings, wherein:

FIG. 7 is an exploded view of a part of a milling tool according to a second embodiment, FIG. 8 is a sectional view of the milling tool shown in FIG. 7 along the line VIII-VIII and corresponding to the view in FIG. 4, FIG. 9 is a sectional view of the milling tool shown in FIG. 7 along the line IX-IX and corresponding to the view in FIG. 5, FIG. 10 is a sectional view of the milling tool shown in FIG. 7 along the line X-X and corresponding to the view in FIG. 6.

Figure 1:
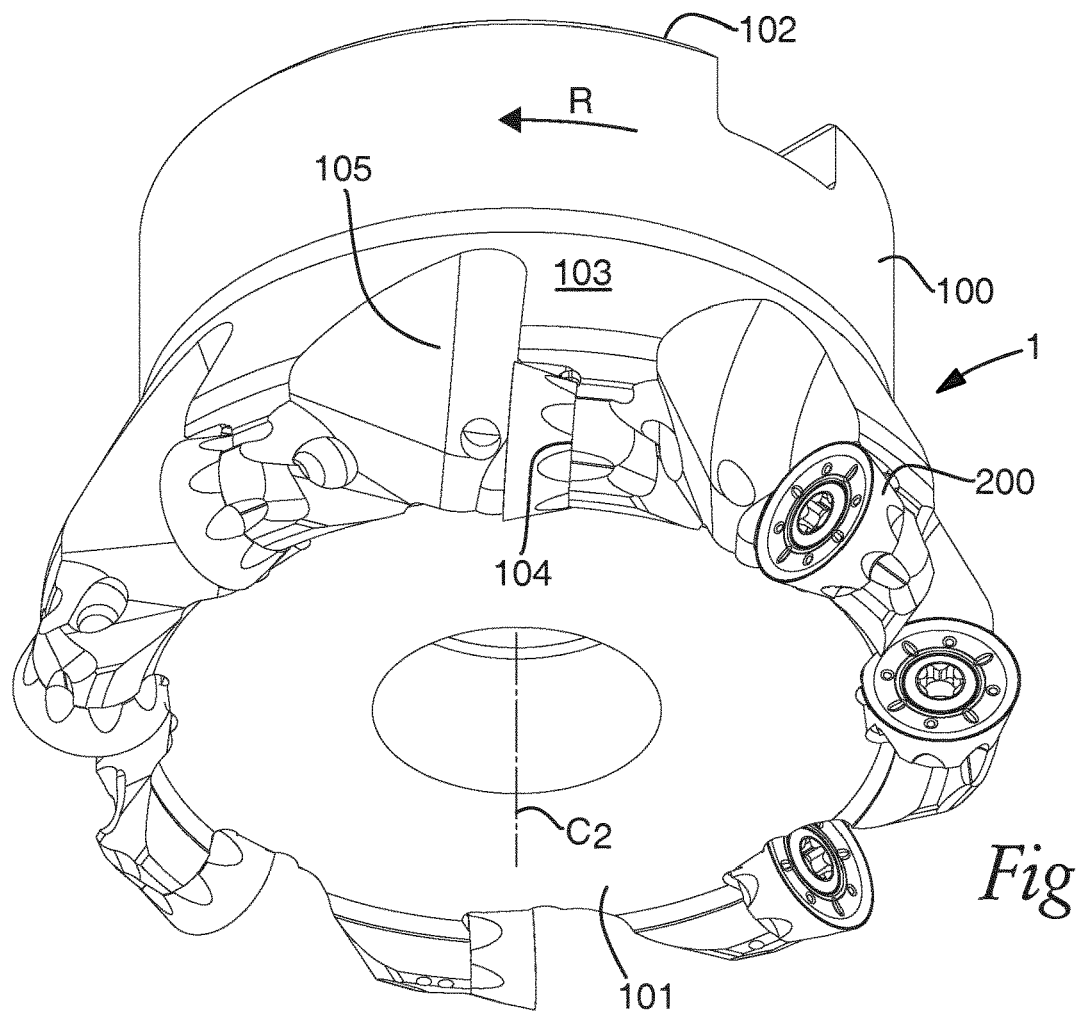
FIG. 1 is a perspective view of a milling tool according to a first embodiment of the invention.
Figure 2:
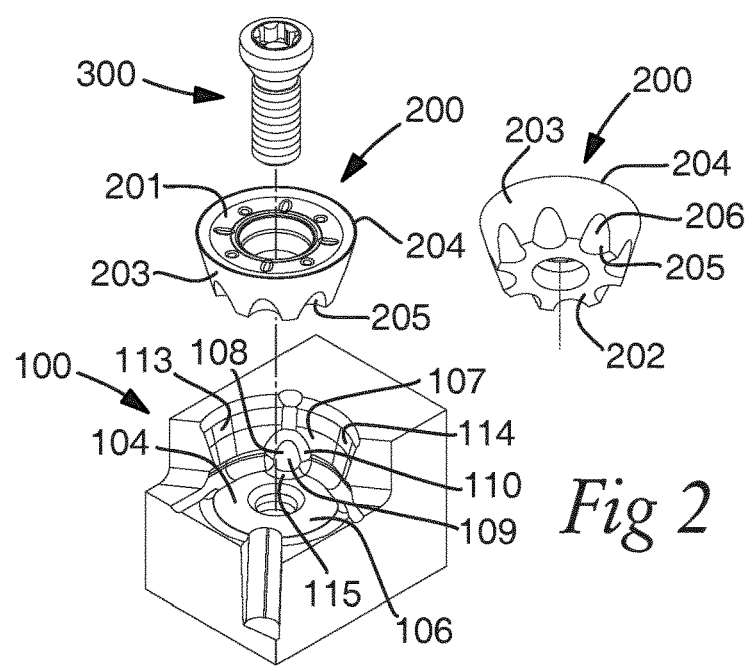
FIG. 2 is an exploded view of a part of the milling tool shown in FIG. 1.
Figure 3:
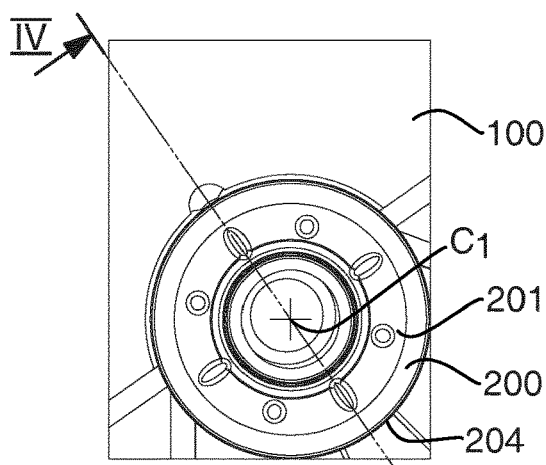
FIG. 3 is an end view of the part in FIG. 2.

It should be noted that the appended drawings are schematic and that individual components are not necessarily drawn to scale and that the dimensions of some features of the present invention may have been exaggerated for the sake of clarity.

DETAILED DESCRIPTION OF PREFERRED EMBODIMENTS

A cutting tool 1 in the form of a milling tool according to a first embodiment of the invention is shown in FIGS. 1-6. Parts of a cutting tool according to second, third and fourth embodiments are shown in FIGS. 7-11, 12 and 13-15, respectively. In the following, common features of all four embodiments will first be described, and specific features of each embodiment will thereafter be described separately.

The cutting tool 1 comprises a body 100 having a front end 101, a rear end 102, and a peripheral side surface 103 extending between the front end 101 and the rear end 102. Eight insert seats 104 are provided at the front end 101, formed in a transition between the front end 101 and the peripheral side surface 103. The cutting tool 1 is configured to be rotated about a central axis $C_2$ in a direction of rotation R. In front of each insert seat 104 in the direction of rotation R, a chip pocket 105 is provided.

The body 100 is configured to receive eight cutting inserts 200, each cutting insert 200 being mounted in one of the insert seats 104. Each cutting insert 200 has a positive cutting geometry and a circular basic shape with an upper rake surface 201, a bottom surface 202 opposite to the rake surface, and a frusto-conical side surface 203 extending between the rake surface 201 and the bottom surface 202 at an angle β of 75° (clearance angle) with respect to the bottom surface 202. In a transition between the rake surface 201 and the side surface 203, a circular cutting edge 204 is formed. The cutting insert 200 has a central axis, which forms a common central axis $C_1$ of the insert seat 104 and the cutting insert 200 when the cutting insert 200 is mounted in the insert seat 104 by means of a screw 300. The cutting insert 200 comprises a through hole, which is centered on the common central axis $C_1$ and which is configured to receive the screw 300. The through hole in the cutting insert 200 comprises a funnel shaped part adjacent to the upper rake surface 201. The funnel shaped part of the through hole is arranged for reception of a head of the screw 300. A central axis $C_3$ of a threaded hole within the insert seat 104, however, does not coincide with the common central axis $C_1$ and there is a displacement between the common central axis $C_1$ and the central axis $C_3$ of the threaded hole within the insert seat. The displacement is arranged such that the screw bends slightly during the mounting of the cutting insert 200 in order to press the cutting insert against the side wall 107 and hold it in place in the insert seat. The common central axis $C_1$ and the central axis $C_3$ of the threaded hole are preferably, but not necessarily, parallel to each other.

In a transition between the side surface 203 and the bottom surface 202 of the cutting insert 200, eight anti-rotation stopping indents 205 are formed, evenly spaced apart around a periphery of the cutting insert 200. The indents 205, which may alternatively be referred to as recesses, are formed as discrete indents in the side surface 203, i.e. the side surface 203 extends all the way to the bottom surface 202 between each two indents 205. The indents 205 are thus spaced from each other and completely delimited by the side surface 203 and the bottom surface 202. Each indent 205 comprises a first stop surface 206, wherein the first stop surface 206 is delimited by the side surface 203 and the bottom surface 202. The first stop surface 206 thus intersects and is adjacent to the side surface 203 of the cutting insert 200. The first stop surface 206 is preferably adjacent to and intersects the bottom surface 202 of the insert. Preferably, the at least one anti-rotation stopping indent 205 is completely defined by the first stop surface 206.

Each insert seat 104 has a bottom support surface 106 configured to abut and support the bottom surface 202 of the cutting insert 200. It further has a side wall 107, configured to face the side surface 203 of the cutting insert 200. In all shown embodiments, two side support surfaces 113, 114 configured to abut and support the side surface 203 of the cutting insert 200 are provided in the side wall 107. The side support surfaces 113, 114 and the bottom support surface 106 are configured for positioning of the cutting insert 200 in the insert seat 104 when the cutting insert 200 is mounted by means of e.g. a screw 300 or another fastening member.

Figure 5:
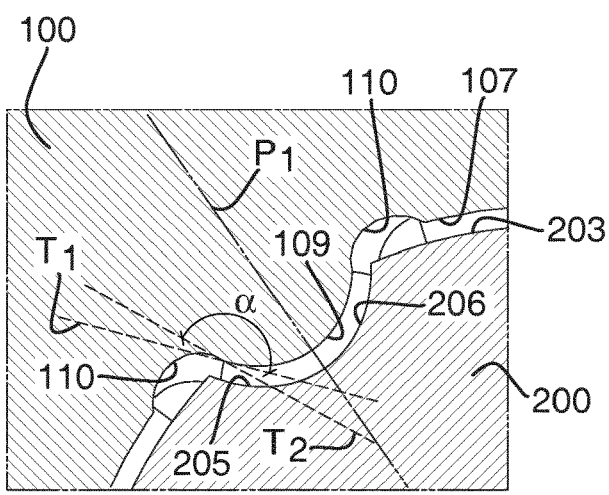
FIG. 5 is a sectional view along the line V-V in FIG. 4.
Figure 6:
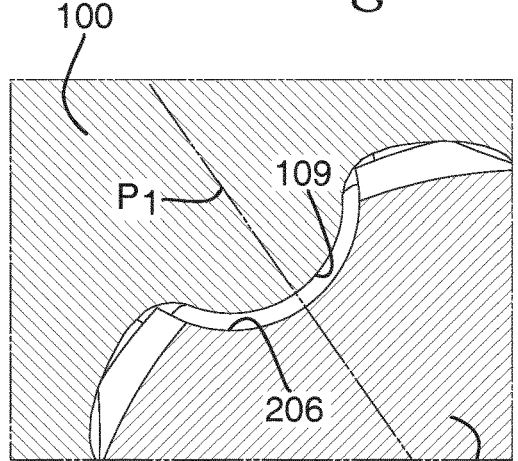
FIG. 6 is a sectional view along the line VI-VI in FIG. 4.
Figure 15:
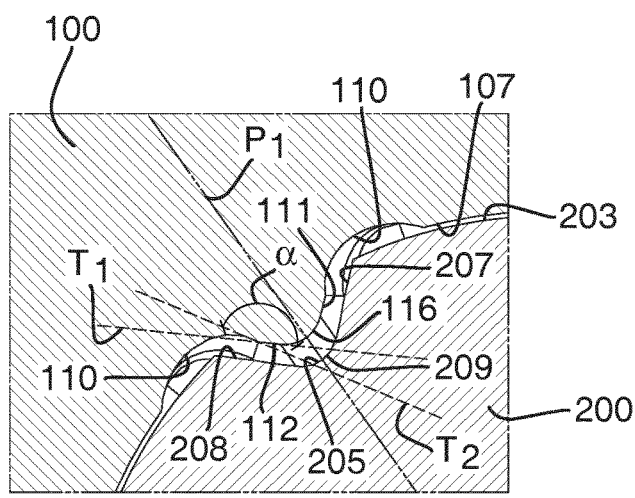
FIG. 15 is a sectional view of the milling tool shown in FIG. 13 along the line XV-XV and corresponding to the view in FIG. 5.

In the insert seat 104, an anti-rotation stop 108 is provided, which is configured to limit rotation of the cutting insert 200 in both directions about the common central axis $C_1$ to 1-2°, such as to 1.3°, when the cutting insert is mounted in the insert seat 104. The anti-rotation stop 108 protrudes with respect to the side wall 107 and comprises a second stop surface 109, protruding with respect to the side wall 107. A concavely curved first duct 110, extending between the second stop surface 109 and the side wall 107, separates the second stop surface 109 from the side wall 107. The first duct 110 is in the shown embodiments indented with respect to the side wall 107, but it is also possible to have a first duct which is not indented with respect to the side wall. The concave curvature of the first duct 110 can be seen in a section perpendicular to the common central axis $C_1$ and intersecting the anti-rotation stop 108, as shown in FIGS. 5, 9 and 15.

Figure 4:
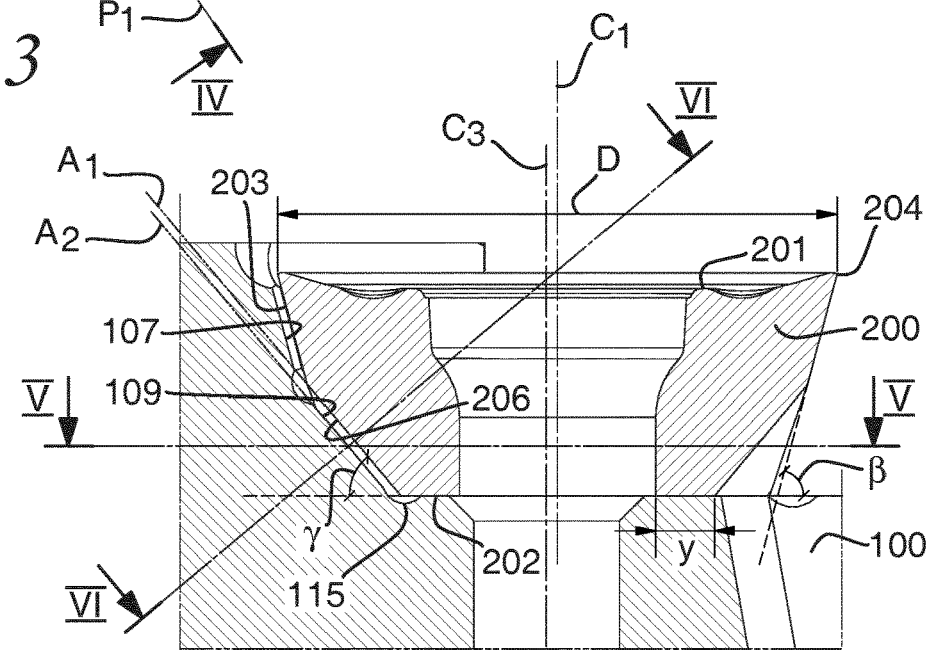
FIG. 4 is a sectional view along the line IV-IV in FIG. 3.
Figure 14:
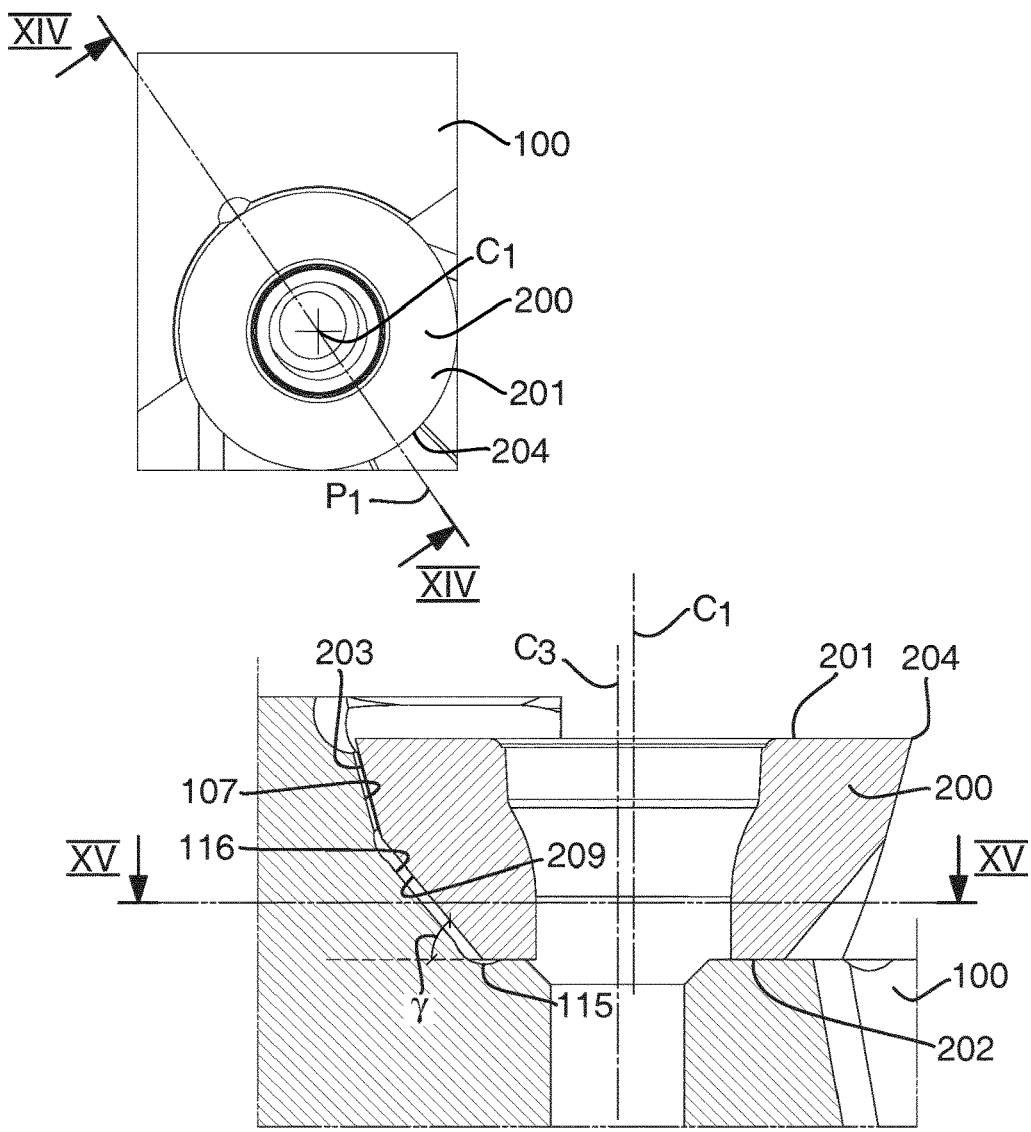
FIG. 14 is a sectional view of the milling tool shown in FIG. 13 corresponding to the view in FIG. 4.

In the shown embodiments, the insert seat 104 further comprises a concavely curved second duct 115, whose concave curvature can be seen in an axial plane $P_1$ containing the common central axis $C_1$, as shown in FIGS. 4, 8 and 14. The second duct 115 extends between the second stop surface 109 and the bottom support surface 106, thus separating the second stop surface 109 from the bottom support surface 106. The second stop surface 109 is thereby delimited by on one hand the first duct 110 and on the other hand the second duct 115. The second duct 115 is in the shown embodiments indented with respect to the bottom support surface 106 and with respect to the second stop surface 109. The second stop surface 109 is completely positioned above the bottom support surface 106.

The second stop surface 109 is adapted to be completely located within the anti-rotation stopping indent 205 when the cutting insert 200 is mounted in the insert seat 104. In other words, when the cutting insert 200 is mounted in the insert seat 104, a shortest distance between any point on the second stop surface 109 and the common central axis $C_1$ is shorter than a shortest distance between the side surface 203 and the common central axis $C_1$ at a corresponding axial level (i.e. in a section perpendicular to the central axis $C_1$). The first duct 110 ensures that a clearance is provided around the second stop surface 109. During machining, the portions of the side walls 107 of the insert seat 104 that are adjacent to the anti-rotation stop 108 are therefore prevented from coming into contact with the cutting insert 200.

When seen in a section taken perpendicularly to the common central axis $C_1$, an angle α of less than 180° is formed between a tangent $T_1$ to the second stop surface 109 and a tangent $T_2$ to the first duct 110 at a transition between the second stop surface 109 and the first duct 110. The transition between the second stop surface 109 and the first duct 110 may be a slightly rounded transition. The angle α may be determined by extending the second stop surface 109 and the first duct 110 in the respective tangential directions as close to the transition as possible, and measure the angle in the intersection between the tangents $T_1$ and $T_2$. This is illustrated in FIGS. 5, 9 and 15. When seen in any section taken perpendicularly to the common central axis $C_1$ and through the transition between the second stop surface 109 and the first duct 110, an angle α of less than 180° is formed between a tangent $T_1$ to the second stop surface 109 and a tangent $T_2$ to the first duct 110 at the transition between the second stop surface 109 and the first duct 110.

When seen in any section perpendicular to the common central axis $C_1$ and through the transition between the second stop surface 109 and the first duct 110, there is at least one part of the first stop surface 206 which is positioned at a larger distance from the common central axis $C_1$ than any point of the transition between the second stop surface 109 and the first duct 110, wherein said any point of the transition between the second stop surface 109 and the first duct 110 and the at least one part of the first stop surface 206 are situated at the same side of a line intersecting the common central axis $C_1$ and the second stop surface 109 in a point of the second stop surface 109 which point is closest to the common central axis $C_1$ in the section.

There is also a transition between the second stop surface 109 and the second duct 115. The transition between the second stop surface 109 and the second duct 115 may be arranged as the transition between the second stop surface 109 and the first duct 110.

In all shown embodiments, each of the anti-rotation stopping indents 205 has a cross sectional area that decreases in an upward axial direction from the bottom surface 202 of the cutting insert 200. The axial extension of the anti-rotation stopping indent 205 along the common central axis $C_1$ of the cutting insert 200 is about 50% of a total axial extension of the cutting insert 200. In a radial direction of the cutting insert, a distance y measured between a point of the indent 205 closest to the common central axis $C_1$ and the through hole of the cutting insert is approximately 10% of a largest diameter D of the cutting insert 200. The distance y may preferably be between 10% and 30% of the diameter D.

The side support surfaces 113, 114 are in the shown embodiments provided on opposite sides of the rotation stop 108. The side support surfaces 113, 114 form part of the side wall 107 and are spaced apart from the anti-rotation stop 108 by portions of the side wall 107 that form clearance surfaces. The insert seat 104 is mirror symmetric with respect to the axial plane $P_1$ through the rotation stop 108. The central axis $C_3$ of the threaded hole in the insert seat 104 is positioned closer to the anti-rotation stop 108 than the common central axis $C_1$ at least along a part of the threaded hole.

In the first embodiment shown in FIGS. 1-6, the first stop surface 206 of the anti-rotation stopping indent is concavely curved and follows an imaginary circular cylinder with a first diameter $d_1$ (not shown), extending along a first longitudinal axis $A_1$ which is inclined with respect to the common central axis $C_1$. The convexly curved surface 109 of the rotation stop 108 of the insert seat 104 has a corresponding shape and follows an imaginary circular cylinder with a second diameter $d_2$ (not shown) extending along a second longitudinal axis $A_2$ which is parallel to the axis $A_1$, wherein $d_1 > d_2$. In a section taken perpendicularly to the axes $A_1$ and $A_2$, the concavely curved surface 206 and the convexly curved surface 109 follow circular arcs. As seen in the axial plane $P_1$, the second stop surface 109 and the first stop surface 206 form straight lines, which are obliquely oriented with respect to the bottom support surface 106 and the bottom surface 202 and extend along the axes $A_1$ and $A_2$ at an angle γ of 50° with respect to the bottom support surface 106. The angle γ may preferably be within the interval 30-75°. Here, the angle γ differs by 25° from the clearance angle β of 75°.

The contact occurring between the first stop surface 206 and the second stop surface 109 upon rotation of the cutting insert about the common central axis $C_1$ is in the first embodiment a limited area contact or a point contact occurring on or close to the transition between the second stop surface 109 and the first duct 110.

In the second and third embodiments, shown in FIGS. 7-11 and FIG. 12 respectively, the cutting insert 200 is identical to the cutting insert 200 of the first embodiment. However, the convexly curved surface 109 of the rotation stop 108 of the insert seat 104 may in this embodiment be described as an extruded spline extending along the axis $A_2$. In a section taken perpendicularly to the axis $A_2$, the convexly curved surface 109 follows a spline, i.e. it comprises portions with different radii of curvature. The second stop surface 109 and the first stop surface 206 form non-parallel straight lines as seen in the axial plane $P_1$, which straight lines are obliquely oriented with respect to the bottom support surface 106 and the bottom surface 202. As in the first embodiment, the straight line formed by the first stop surface 206 extend at an angle γ of 50° with respect to the bottom support surface 106.

The second embodiment differs from the third embodiment in that the side support surfaces 113, 114 of the side wall 107 of the insert seat 104 are configured to contact the side surface 203 of the cutting insert 200 only along an upper portion of the side surface 203. A lower portion of the side wall 107 therefore extends at a different angle with respect to the common central axis $C_1$ than the side support surfaces 113, 114.

Figure 11:
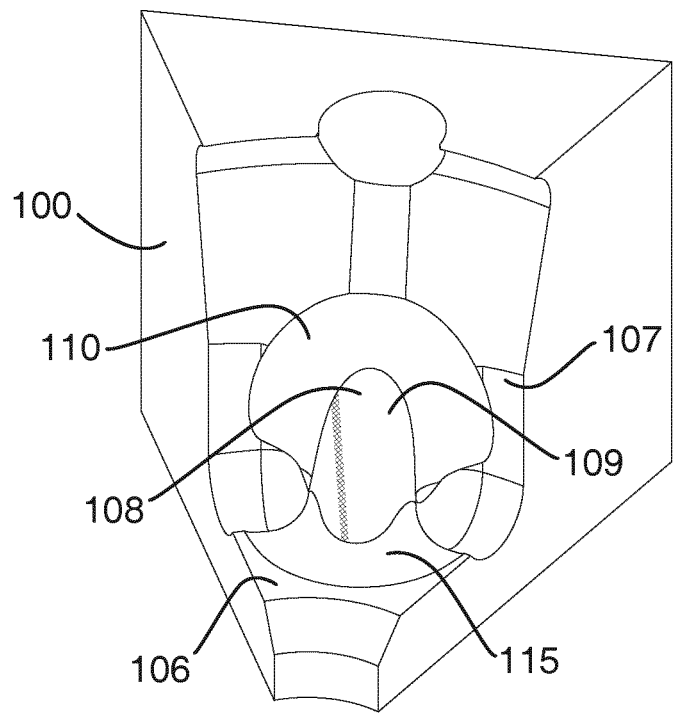
FIG. 11 is a partial view of an insert seat of the milling tool in FIG. 7.
Figure 12:
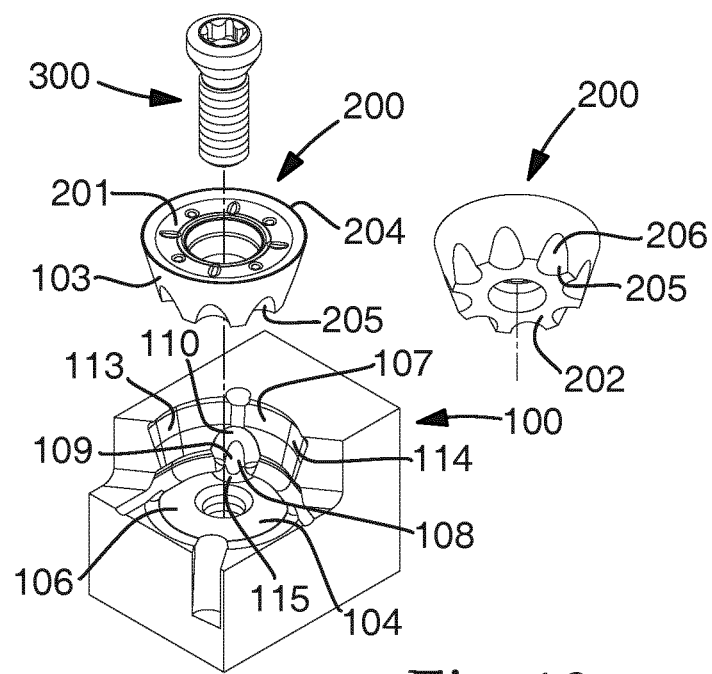
FIG. 12 is an exploded view of a part of a milling tool according to a third embodiment.

The contact occurring between the first stop surface 206 and the second stop surface 109 upon rotation of the cutting insert about the common central axis $C_1$ is in the second and third embodiments a line contact extending between a first position on the transition to the first duct 110 or close to the first duct 110, and a second position on the transition to the second duct 115 or close to the second duct 115. This is illustrated in FIG. 11, showing the anti-rotation stop 108 of the second embodiment, wherein the line contact is schematically indicated as a shaded area.

Figure 13:
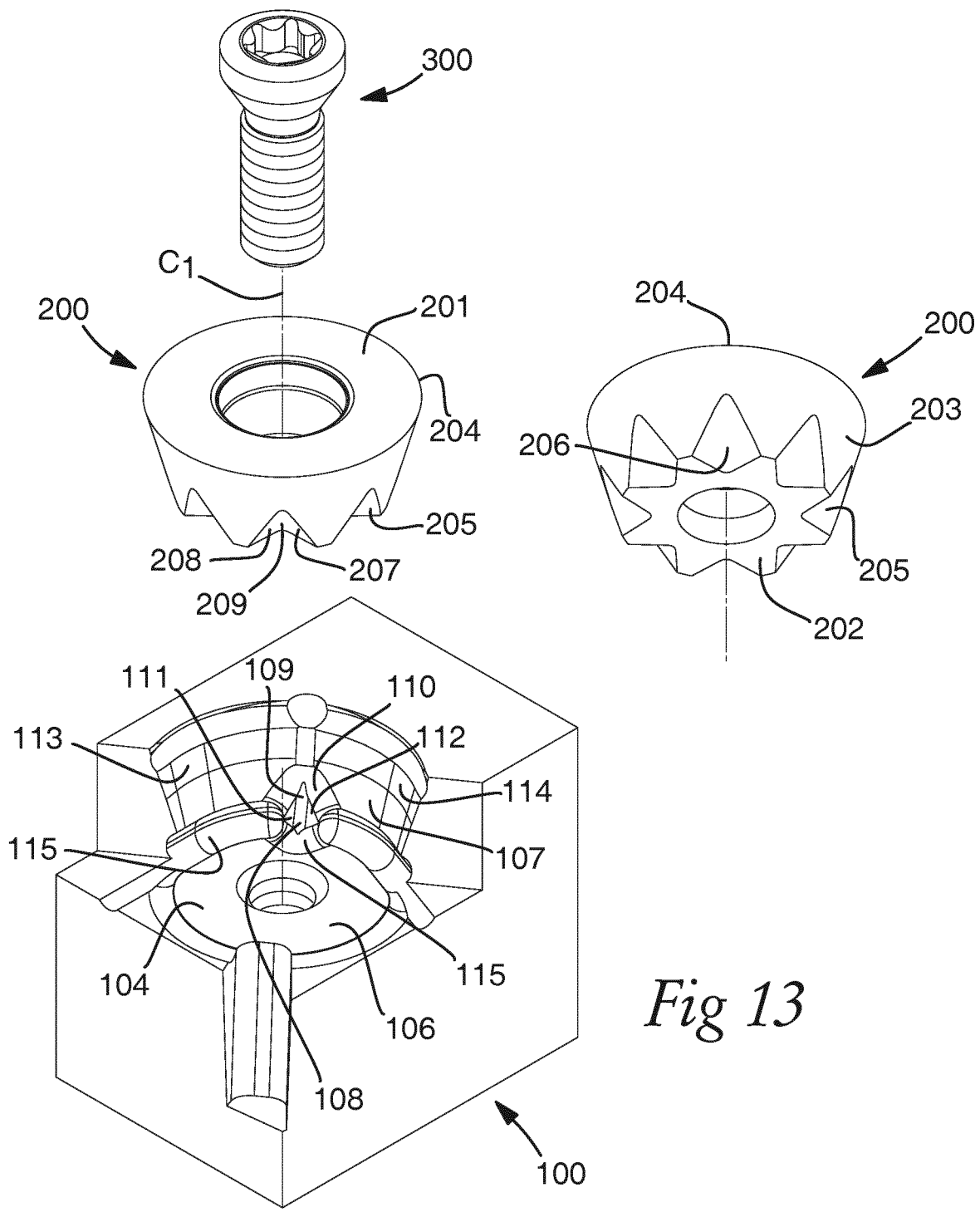
FIG. 13 is an exploded view of a part of a milling tool according to a fourth embodiment.

In the fourth embodiment shown in FIGS. 13-15, the first stop surface 206 of the anti-rotation stopping indent 205 comprises a first pair of planar surface portions 207, 208 positioned on either side of a concavely curved surface portion 209. The second stop surface 109 of the anti-rotation stop 108 correspondingly comprises a second pair of planar surface portions 111, 112 adjacent to the first duct 110 and the second duct 115, extending on either side of a convexly curved surface portion 116. The first planar surface portion 207 is herein parallel to the second planar surface portion 111, but it is also possible for the surface portions to be non-parallel. The second planar surface portions 111, 112 of the anti-rotation stop 108, as well as the convexly curved surface portion 116 thereof, are completely located within the rotation stopping indent 205 as the cutting insert 200 is mounted in the insert seat 104. As in the first embodiment, the second stop surface 109 and the first stop surface 206 form parallel straight lines as seen in the axial plane $P_1$, which straight lines are obliquely oriented at an angle γ of 50° with respect to the bottom support surface 106 and the bottom surface 202.

In the fourth embodiment, the contact between the first stop surface 206 and the second stop surface 109 occurring upon rotation of the cutting insert about the common central axis $C_1$ is between one of the second planar surface portions 111, 112 of the insert seat 104 and a corresponding one of the first planar surface portions 207, 208 of the cutting insert 200, depending on the direction of rotation of the cutting insert 200 in the insert seat 104. With parallel surface portions, an area contact may arise upon rotation of the cutting insert, while as for non-planar surface portions a linear contact may arise.

The cutting tool may of course comprise a different number of insert seats and cutting inserts than in the above described embodiments. A fastening member other than a screw, for example a clamp, may be used for fastening the cutting insert. The cutting insert may also comprise a different number of anti-rotation stopping indents, depending on e.g. the size of the cutting insert. The cutting tool may also comprise a cassette holding the cutting insert, or a shim plate positioned between the bottom support surface of the insert seat and the bottom surface of the cutting insert.

Further modifications of the invention within the scope of the appended claims are feasible. As such, the present invention should not be considered as limited by the embodiments and figures described herein. Rather, the full scope of the invention should be determined by the appended claims, with reference to the description and drawings.

The invention claimed is:

1. A cutting tool for chip removing machining of workpieces, the cutting tool comprising:
    a body; and
    at least one cutting insert arranged to be mounted in an insert seat of the body, the cutting insert and the insert seat sharing a common central axis when the cutting insert is mounted in the insert seat, wherein the cutting insert has a circular basic shape and comprises:
    a rake surface,
    a bottom surface opposite to the rake surface,
    a side surface extending between the rake surface and the bottom surface,
    a cutting edge formed in a transition between the side surface and the rake surface, and
    at least one anti-rotation stopping indent formed in a transition between the bottom surface and the side surface and including a first stop surface, wherein the insert seat of the body comprises:
- a bottom support surface configured to abut and support the bottom surface of the cutting insert,
- a side wall including at least one side support surface configured to abut and support the side surface of the cutting insert,
- at least one anti-rotation stop protruding with respect to the side wall and comprising a second stop surface, and
- a concavely curved first duct separating the second stop surface from the side wall, wherein the at least one anti-rotation stop is arranged to inhibit rotation of the cutting insert in the insert seat about the common central axis by contact between the first stop surface and the second stop surface, wherein the second stop surface is completely located within the anti-rotation stopping indent when the cutting insert is mounted in the insert seat, and, when seen in a section taken perpendicularly to the common central axis, an angle of less than 180° is formed between a tangent to the second stop surface and a tangent to the first duct at a transition between the second stop surface and the first duct, and
- a concavely curved second duct extending between the second stop surface and the bottom support surface.

2. The cutting tool according to claim 1, wherein the second stop surface and the first stop surface are symmetric with respect to an axial plane containing the common central axis and intersecting the anti-rotation stopping indent.

3. The cutting tool according to claim 1, wherein the first duct is indented with respect to the side wall.

4. The cutting tool according to claim 1, wherein the second stop surface is convexly curved when seen in a section taken perpendicularly to the common central axis.

5. The cutting tool according to claim 1, wherein the first stop surface is concavely curved when seen in a section taken perpendicularly to the common central axis.

6. The cutting tool according to claim 1, wherein the second stop surface intersects an axial plane containing the common central axis along a first line, the first line being obliquely inclined with respect to the bottom support surface.

7. The cutting tool according to claim 1, wherein the at least one anti-rotation stopping indent has a cross sectional area that decreases in an upward axial direction from the bottom surface.

8. The cutting tool according to claim 1, wherein the first stop surface and the second stop surface are configured so that the contact occurring between the first stop surface and the second stop surface upon rotation of the cutting insert about the common central axis is a line contact.

9. The cutting tool according to claim 1, wherein the at least one anti-rotation stopping indent has an axial extension along the common central axis, which axial extension is between 30-60% of a total axial extension of the at least one cutting insert.

10. The cutting tool according to claim 1, wherein the second stop surface includes a pair of planar surface portions adjacent to the first duct.

11. The cutting tool according to claim 1, wherein the at least one side support surface of the insert seat includes two side support surfaces provided on opposite sides of the anti-rotation stop.

12. The cutting tool according to claim 1, wherein the anti-rotation stop and the anti-rotation stopping indent are configured so that the contact between the first stop surface and the second stop surface occurs at least partially on the transition between the second stop surface and the first duct.

13. The cutting tool according to claim 1, wherein the body is a tool body having a front end arranged for cutting engagement with a workpiece and a rear end arranged for mounting the cutting tool to a tool holder, wherein the insert seat is provided in the front end of the body.

14. The cutting tool according to claim 1, wherein the cutting tool is a milling tool.

* * * * *